United States Patent
Campolo et al.

(10) Patent No.: US 6,176,717 B1
(45) Date of Patent: Jan. 23, 2001

(54) ELECTRICAL EXTENSION CORD WITH IMMERSION DETECTION CIRCUIT INTERRUPTER SAFETY PROTECTION

(75) Inventors: Steve Campolo, Valley Stream; Bernard Gershen, Centerport, both of NY (US)

(73) Assignee: Leviton Manufacturing Co., Inc., Little Neck, NY (US)

( * ) Notice: Under 35 U.S.C. 154(b), the term of this patent shall be extended for 0 days.

(21) Appl. No.: 09/259,237

(22) Filed: Mar. 1, 1999

(51) Int. Cl.[7] .............................. H01R 13/53; H02H 3/00
(52) U.S. Cl. ................................. 439/181; 361/42
(58) Field of Search .................................. 439/181, 502, 439/911; 361/50, 42, 178, 46, 48, 115; 200/61.04

(56) References Cited

U.S. PATENT DOCUMENTS

| | | | |
|---|---|---|---|
| 3,426,342 | * 2/1969 | De Langis | 340/649 |
| 3,659,152 | * 4/1972 | De Langis | 317/18 B |
| 4,709,293 | * 11/1987 | Gershen et al. | 361/50 |
| 4,712,154 | * 12/1987 | Madsen | 361/178 |
| 4,751,603 | * 6/1988 | Kwan | 361/42 |
| 4,797,772 | * 1/1989 | Kaplanis | 361/42 |
| 4,851,951 | * 7/1989 | Foster, Jr. | 361/50 |
| 5,102,345 | * 4/1992 | Stanwick et al. | 439/181 |

* cited by examiner

*Primary Examiner*—Brian Sircus
*Assistant Examiner*—Chandrika Prasad
(74) *Attorney, Agent, or Firm*—Paul J. Sutton

(57) ABSTRACT

An extension cord having a male plug at one end and a receptacle at the other has a mechanism for opening the phase and neutral conductors in the event the receptacle is subjected to a conductive media. A recess in the face of the receptacle receives a first immersion detection electrode and a spaced, parallel, second immersion detection electrode. A conducting media bridging the two immersion detection electrodes sends a signal to an operating device which causes the opening of the phase and neutral conductors until the conducting media is removed.

6 Claims, 1 Drawing Sheet

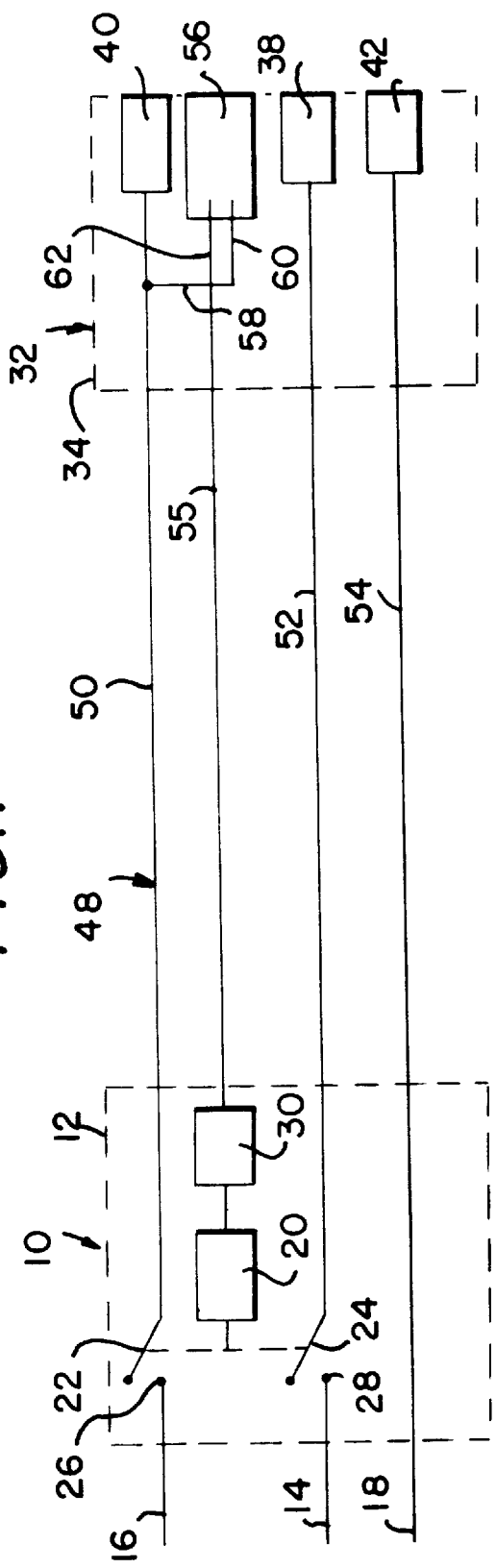
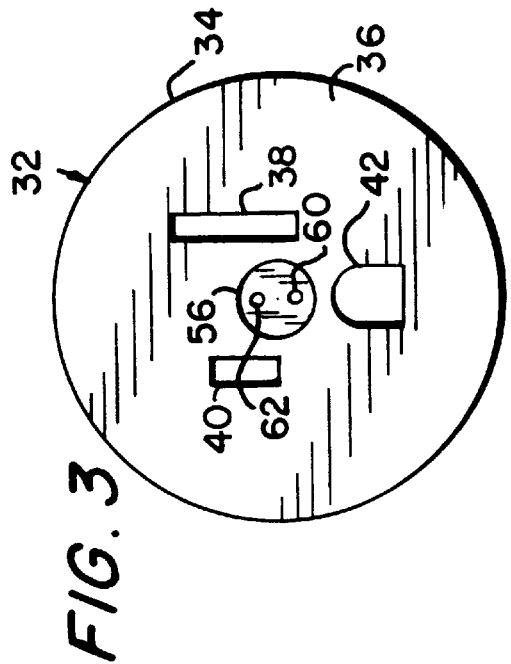
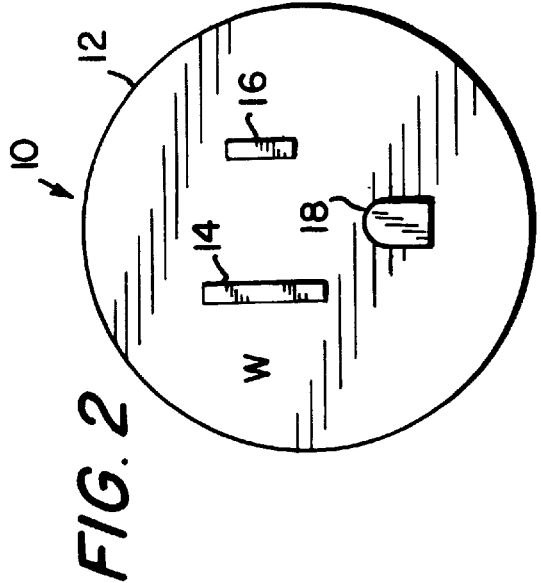

ELECTRICAL EXTENSION CORD WITH IMMERSION DETECTION CIRCUIT INTERRUPTER SAFETY PROTECTION

BACKGROUND OF THE INVENTION

1. Field of the Invention

The invention is directed to providing safety protection for electrical extension cords and namely to an electrical extension cord having immersion detection circuit interrupter (IDCI) safety protection.

2. Description of the Prior Art

One known electrical extension cord provides safety protection in the form of a ground fault circuit interrupter (GFCI). The cord is surrounded by a shield layer which monitors any leakage and operates the GFCI in response to predetermined leakage levels.

However, no extension cords are known which employ safety protection in the form of an IDCI.

SUMMARY OF THE INVENTION

The instant invention provides safety protection for an electrical extension cord in the form of an IDCI. Electrical extension cords are commonly used throughout a home and in the grounds of such home for a variety of purposes. Some of these purposes involve using the extension cord in wet surroundings, such as the garden, the bath, the basement and similar places. Also the extension cord is often left out in the rain. The use of a wet extension cord could cause significant injury to the user and/or damage to equipment and property. An extension cord constructed in accordance with the instant invention can prevent such matters by opening the phase and neutral conductors of the extension cord at the plug end in the event moisture is detected at the receptacle end of the extension cord.

The electrical extension cord uses a four conductor electrical cable, consisting of individually insulated conductors all surrounded by an insulating jacket. One conductor is the phase conductor, one conductor is the neutral conductor, one is the ground conductor and the fourth is the sense conductor. A plug housing has three blades, one each for the phase, neutral and ground conductors. The plug housing further comprises electrical switches in said phase and neutral conductors which can be used to open the phase and neutral lines and prevent the passage of current through the extension cord. An operating device coupled to the electrical switches controls their positions in response to a signal provided by a pair of contacts at the receptacle end via the sense conductor. The pair of contacts are placed in a recess in the face of the receptacle and can be bridged by a conducting media such as water to provide the signal. It is an object of this invention to provide an electrical extension cord with IDCI safety protection.

It is an object of this invention to provide an electrical extension cord that can sense moisture and open the conductors of such cord.

It is still another object of this invention to provide an electrical extension cord that can sense moisture at its receptacle end and cause the phase and neutral conductors of the cord to be opened at its plug end.

Other objects and features of the invention will be pointed out in the following description and claims and illustrated in the accompanying drawings, which disclose, by way of example, the principles of the invention, and the best mode, which is presently contemplated for carrying them out.

BRIEF DESCRIPTION OF THE DRAWING

In the drawings in which similar elements are given similar reference characters:

FIG. 1 is a schematic drawing of an electrical extension cord according to the concepts of the invention.

FIG. 2 is a front elevational view of the face of the plug with extending plug blades.

FIG. 3 is a front elevational view of the face of the receptacle with the plug blade passageways and a recess maintaining two moisture-sensing conductors.

DESCRIPTION OF THE PREFERRED EMBODIMENT

Turning now to FIGS. 1, 2 and 3 an electrical extension cord constructed in accordance with the concepts of the invention is shown. Plug 10 has a housing 12 from which project flat plug blades 14 and 16 and a curved ground blade 18. The phase blade 16 is smaller than the neutral blade 14 as is the usual industry practice. Further, within the housing 12 is located a solenoid operated relay 20 coupled to movable contact 22 for the phase line and to movable contact 24 for the neutral line. The position of movable contacts 22, 24, respectively, in FIG. 1 are in the open position which opens both the phase and neutral conductors. When the solenoid operated relay 20 no longer receives an operating signal, the normally closed movable contacts 22 and 24 will engage fixed contacts 26 and 28 and complete the phase and neutral conductors and current can flow to the receptacle 32. A control device 30 is coupled to solenoid operated relay 20 to operate it in accordance with the detection of moisture at the receptacle 32 as will be set forth below.

Receptacle 32 comprises a housing 34 having a front face 36 in which are placed blade passageways. Passageway 38 receives the neutral conductor, passageway 40 receives the phase conductor and passageway 42 receives the ground conductor. Behind the blade passageways through the front face 36 are chambers in which the contacts are placed. The contacts (not shown) engage the flat plug blades 14 and 16 and the curved ground blade 18 and make good electrical and mechanical contact between the conductors of the extension cord and the load (not shown) plugged into receptacle 32.

The electrical cable 48 which joins plug 10 to receptacle 32 is made up of a phase conductor 50 that connects movable contact 22 and plug blade 16 to the contact (not shown) in passageway 40; a neutral conductor 52 joins plug blade 14, movable contact 24 to the contact (not shown) in passageway 38 and a ground conductor 54 joins the curved ground blade 18 to the contact (not shown) in passageway 42.

In addition to the passageways 38, 40, and 42, there is also a recess 56 which opens from the front face 36 of the receptacle 32. Extending into recess 56 is a jumper 58 which ties the phase line 50 to a first immersion detection electrode 60. A sense conductor 55, part of the cable 48, is connected between the control device 30 and a second immersion detection electrode 62 also within recess 56. The first immersion detector electrode 60 and the second immersion detector electrode are arranged in parallel and are spaced apart. A conductive media, such as water (not shown) can enter the recess 56 and bridge the electrodes 60 and 62 and send a signal via sense conductor 55 to the control device 30. The control device 30 in turn sends a signal to the solenoid operated relay 20 which causes the movable contacts 22 and 24 to break contact with fixed contacts 26, 28, respectively, and thus open the phase line 50 and the neutral line 52. Although FIG. 3 shows the electrodes 60 and 62 stacked vertically any other orientation may be employed. Once the moisture is removed from recess 56 and the electrodes 60 and 62 are no longer bridged by the media, the signal is no longer applied via sense conductor 55 and the control device 30 to the solenoid operated relay 20 and movable contacts 22 and 24 can engage fixed contacts 26, 28, respectively, closing phase line 50 and neutral line 52. This places the extension cord back in operating condition.

While there have been shown and described and pointed out the fundamental novel features of the invention as applied to the preferred embodiment, as is presently contemplated for carrying them out, it will be understood that various omissions and substitutions and changes of the form and details of the device illustrated and in its operation may be made by those skilled in the art, without departing from the spirit of the invention.

We claim:

1. An electrical extension cord including built-in safety protection, comprising:
   a) an electrical cable including separately insulated phase, neutral, sense and ground conductors;
   b) an electrical receptacle electrically connected to said electrical cable at first ends of said phase, neutral and ground conductors and having three blade passages in a front face each connecting with one of said phase, neutral and ground conductors to receive an electrical plug with a similar blade configuration;
   c) a recess in said front face of said electrical receptacle to receive a first end of said sense conductor and a further conductor coupled adjacent to a first end of said phase conductor in spaced apart relationship and exposed to said front face of said electrical receptacle, said first end of said sense conductor and a free end of said further conductor designed to be bridged by a conducting media and said sense conductor conducts a first signal upon said bridging; and
   d) an electrical plug comprising a plug housing, phase, neutral and ground plug blades, and an immersion detection circuit interrupter (IDCI), wherein said IDCI is electrically connected adjacent second ends of said electrical cable, to said phase and neutral conductors and to the second end of said sense conductor, said phase, neutral and ground conductors are coupled at said phase, said neutral and ground plug blades, respectively, whereby said first signal is applied to said IDCI to operate said IDCI to open said phase and neutral conductors.

2. An electrical extension cord, as defined in claim 1, wherein said IDCI is comprised of:
   a) a control device coupled to said second end of said sense conductor;
   b) a first movable contact and a first fixed contact adjacent said phase conductor second end to conduct electrical current through said phase conductor when said first moveable contact engages said first fixed contact in a first position and not to permit the passage of current through said phase conductor when said first movable contact does not engage said first fixed contact in a second position;
   c) a second movable contact and a second fixed contact adjacent said neutral conductor second end to conduct electrical current through said neutral conductor when said second movable contact engages said second fixed contact in a third position and not permit the passage of current through said neutral conductor when said second movable contact does not engage said second fixed contact in a fourth position; and
   d) operating means coupled to said control device for positioning said first movable contact between said first and second positions and said second movable contact between said third and fourth positions.

3. An electrical extension cord, as defined in claim 2, wherein said operating means is a solenoid operated relay.

4. An electrical extension cord, as defined in claim 1, wherein said conducting media is water.

5. An electrical extension cord, as defined in claim 1, wherein said recess is disposed between said three blade passages.

6. An electrical extension cord, as defined in claim 2, wherein said first movable contact and said second movable contact are operated in tandem.

* * * * *